United States Patent
McCarthy et al.

(10) Patent No.: US 11,133,583 B2
(45) Date of Patent: *Sep. 28, 2021

(54) DYNAMIC INFORMATION STORAGE TO ENABLE ANGLE-OF-ARRIVAL SMART ANTENNAS

(71) Applicant: Cisco Technology, Inc., San Jose, CA (US)

(72) Inventors: Stephen J. McCarthy, Norton, OH (US); Matthew A. Silverman, Shaker Heights, OH (US); Paul J. Stager, Akron, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/420,485

(22) Filed: May 23, 2019

(65) Prior Publication Data
US 2019/0280380 A1   Sep. 12, 2019

Related U.S. Application Data

(63) Continuation of application No. 15/220,711, filed on Jul. 27, 2016, now Pat. No. 10,361,482.

(51) Int. Cl.
| | |
|---|---|
| *H01Q 3/00* | (2006.01) |
| *H01Q 3/24* | (2006.01) |
| *H01Q 21/00* | (2006.01) |
| *H04B 7/06* | (2006.01) |
| *H04B 7/08* | (2006.01) |

(52) U.S. Cl.
CPC ............ *H01Q 3/24* (2013.01); *H01Q 3/247* (2013.01); *H01Q 21/00* (2013.01); *H04B 7/0691* (2013.01); *H04B 7/0874* (2013.01)

(58) Field of Classification Search
CPC .......... H01Q 3/24; H01Q 3/247; H01Q 21/00; H04B 7/0691; H04B 7/0874
USPC ........................................................ 342/374
See application file for complete search history.

(56) References Cited

U.S. PATENT DOCUMENTS

| | | |
|---|---|---|
| 6,208,636 B1 | 3/2001 | Tawil et al. |
| 6,771,218 B1 | 8/2004 | Lalezari et al. |
| 6,859,168 B2 | 2/2005 | Isaji |
| 6,907,272 B2 | 6/2005 | Roy |
| 7,039,370 B2 | 5/2006 | Laroia et al. |
| 7,478,759 B2 | 1/2009 | Ung |
| 7,580,729 B2 | 8/2009 | Ozluturk |

(Continued)

*Primary Examiner* — Chuong P Nguyen
(74) *Attorney, Agent, or Firm* — Edell, Shapiro & Finnan, LLC

(57) ABSTRACT

An apparatus comprises an antenna array, a block of switches, a programmable logic device and a memory device. The antenna array comprises a plurality of antenna elements. The block of switches is configured to selectively connect respective ones of a subset of the plurality of antenna elements to corresponding ones of a plurality of transceivers in a host device. The programmable logic device is configured to communicate with the host device and to control the block of switches. The memory device is coupled to the programmable logic device, and is configured to store information allowing the host device to determine how to control connectivity of individual antenna elements to respective ones of the plurality of transceivers of the host device as part of transmit and/or receive operations of the host device.

20 Claims, 8 Drawing Sheets

(56) References Cited

U.S. PATENT DOCUMENTS

| | | | |
|---|---|---|---|
| 7,952,525 B2 | 5/2011 | Hirabayashi | |
| 8,108,020 B2 | 1/2012 | Anderson et al. | |
| 8,369,897 B2 | 2/2013 | Ozluturk | |
| 9,647,868 B2* | 5/2017 | Jiao | G01S 1/042 |
| 9,674,652 B2* | 6/2017 | Ranki | H01Q 21/00 |
| 9,823,330 B2* | 11/2017 | Hart | G01S 3/38 |
| 10,361,482 B2* | 7/2019 | McCarthy | H01Q 3/247 |
| 10,447,093 B2* | 10/2019 | Hosseini | H02J 50/40 |
| 10,476,312 B2* | 11/2019 | Johnston | H02J 50/20 |
| 10,665,939 B2* | 5/2020 | Avakian | H01Q 1/50 |
| 2005/0176374 A1 | 8/2005 | Fang et al. | |
| 2006/0164300 A1 | 7/2006 | Ellard | |
| 2011/0150050 A1* | 6/2011 | Trigui | H04B 17/12 |
| | | | 375/219 |
| 2012/0299765 A1* | 11/2012 | Huang | H01Q 21/205 |
| | | | 342/81 |
| 2014/0327579 A1* | 11/2014 | Hart | H04W 64/006 |
| | | | 342/374 |
| 2018/0034151 A1 | 2/2018 | McCarthy et al. | |
| 2018/0045805 A1 | 2/2018 | Hart et al. | |
| 2018/0084555 A1* | 3/2018 | Mori | H04B 7/00 |
| 2020/0119592 A1* | 4/2020 | Hosseini | H02J 7/0042 |

* cited by examiner

| FIELD DESCRIPTION | NOTES |
|---|---|
| ANTENNA SERIAL NUMBER | |
| ANTENNA ARRAY CAPABILITY | FOR EACH BIT, 1 INDICATES CAPABLE, 0 IS NOT CAPABLE; LSB (BIT 0) - 2.4 GHZ WI-FI, BIT 1 - 5 GHZ WI-FI, BIT 2 - BLUETOOTH, BIT 3 - ACCELEROMETER |
| ANTENNA PID | |
| NUMBER OF CHANNEL RECORDS | BECOMES VARIABLE R IN "MAGNITUDE CAL" AND "PHASE CAL" |
| NUMBER OF ANTENNA IN ARRAY | BECOMES VARIABLE M IN "ANTENNA ELEMENT INFORMATION" |
| CAL VERSION (MAJOR AND MINOR, ONE BYTE EACH) | |
| EEPROM FORMAT VERSION | THIS CAN BE USED TO KNOW WHETHER THE CALIBRATION IS PER ANTENNA OR PER ANTENNA STATE AND TO HANDLE FUTURE CHANGES TO THIS FORMAT |
| NUMBER OF RF PATHS | |
| NUMBER OF CPLD REGISTER BANKS | BECOMES VARIABLE Q IN "ANTENNA STATE DEFINITION" |
| NUMBER OF VALID STATES | BECOMES VARIABLE S IN "ANTENNA STATE DEFINITION" |
| NUMBER OF SEQUENCES | BECOMES VARIABLE T IN "ANTENNA STATE SEQUENCES" |
| NUMBER OF DEFAULT SEQUENCES | BECOMES VARIABLE Z IN "ANTENNA STATE SEQUENCES" |
| STARTING LOCATION OF ANTENNA ELEMENT INFORMATION | |
| STARTING LOCATION OF ANTENNA STATE DEFINITION | |
| STARTING LOCATION OF ANTENNA STATE SEQUENCES | |
| STARTING LOCATION OF SEQUENCE LIST | THE STARTING EEPROM LOCATION OF THE SEQUENCE DEFINITIONS AFTER THE DEFAULT SEQUENCES |
| STARTING LOCATION OF CAL DATA | |
| CHANNEL RECORD TO FREQUENCY MAPPING | THIS FIELD LISTS THE FREQUENCY IN MHZ FOR EACH CHANNEL RECORD (0 THROUGH [NUMBER_OF_CHANNEL_RECORDS MINUS 1]). THE SIZE OF THIS FIELD IS 2 BYTES * NUMBER_OF_CHANNEL_RECORDS |

FIG.3

| FIELD DESCRIPTION | NOTES |
|---|---|
| ANTENNA ELEMENT 1 | |
| ANTENNA ELEMENT IDENTIFIER | UNIQUE PART NUMBER FOR THE ANTENNA ELEMENT MATCHED WITH PATTERN INFORMATION |
| PART NUMBER | UNIQUE PART # OR IDENTIFIER FOR THE ANTENNA MODEL (ASCII REPRESENTATION) |
| ANTENNA ELEMENT FREQUENCY | 2GHZ ONLY = 0, 5GHZ ONLY = 1, OR DUAL BAND = 2 |
| ANTENNA ELEMENT TYPE | MONOPOLE = 1, DIPOLE = 2, ETC. |
| NUMBER OF RF PATHS TO ANTENNA 1 | |
| NUMBER OF DIRECTIONS FOR EACH RF PATH | BIDIRECTIONAL -> 1, SEPARATE VALUES FOR RX/TX -> 2 |
| ANTENNA ELEMENT LOCATION | TABLE THAT MAPS EACH ANTENNA ELEMENT TO A RELATIVE LOCATION (X,Y,Z) IN THE ARRAY. RELATIVE TO ARRAY CENTER. |
| X LOCATION | |
| Y LOCATION | |
| Z LOCATION | |
| ANTENNA ELEMENT ORIENTATION | UNIT NORMAL VECTOR OF EACH ELEMENT (USED WITH ELEMENT PATTERN INFORMATION) |
| ANTENNA ORIENTATION MARKER (X, Y, Z) | RELATIVE LOCATION (X,Y,Z) OF THE VISIBLE ORIENTATION MARKER ON THE ARRAY ASSEMBLY. RELATIVE TO ARRAY CENTER. |
| X LOCATION OF ORIENTATION MARKER | |
| Y LOCATION OF ORIENTATION MARKER | |
| Z LOCATION OF ORIENTATION MARKER | |
| SPARE | |
| ANTENNA ELEMENT 2 | |
| ... | |
| ANTENNA ELEMENT m | WHERE m IS "NUMBER OF ANTENNAE IN ARRAY" DEFINED IN THE EEPROM HEADER |

FIG.4

| FIELD DESCRIPTION | NOTES |
|---|---|
| STATE 1 | |
| STATE IDENTIFIER | NUMBER TO IDENTIFY A PARTICULAR STATE |
| NUMBER OF ANTENNA IN STATE | BECOMES VARIABLE p BELOW |
| NUMBER OF APPLICABLE CPLD REGISTER BANKS | BECOMES VARIABLE q BELOW |
| RF PATH 1 IDENTIFIER | HEXADECIMAL REPRESENTATION OF RF PATH (E.G. 0X00 FOR RF PATH A) |
| RF PATH 1 ANTENNA ASSIGNMENT | HEXADECIMAL REPRESENTATION OF ANTENNA ELEMENT TO WHICH PREVIOUS CELL'S PATH IS MAPPED (E.G. 0X01 IS ANTENNA ELEMENT 1) |
| RF PATH 2 IDENTIFIER | HEXADECIMAL REPRESENTATION OF RF PATH (E.G. 0X03 FOR RF PATH D) |
| RF PATH 2 ANTENNA ASSIGNMENT | HEXADECIMAL REPRESENTATION OF ANTENNA ELEMENT TO WHICH PREVIOUS CELL'S PATH IS MAPPED (E.G. 0X0F IS ANTENNA ELEMENT 15) |
| ... | |
| RF PATH p IDENTIFIER | HEXADECIMAL REPRESENTATION OF RF PATH (E.G. 0X08 FOR RF PATH H) WHERE p IS "NUMBER OF ANTENNA IN STATE" |
| RF PATH p ANTENNA ASSIGNMENT | HEXADECIMAL REPRESENTATION OF ANTENNA ELEMENT TO WHICH PREVIOUS CELL'S PATH IS MAPPED (E.G. 0X20 FOR ANTENNA ELEMENT 32) WHERE p IS "NUMBER OF ANTENNAE IN STATE" |
| CPLD REGISTER BANK ADDRESS 1 | |
| VALUE FOR CPLD REGISTER BANK ADDRESS 1 | |
| CPLD REGISTER BANK ADDRESS 2 | |
| VALUE FOR CPLD REGISTER BANK ADDRESS 2 | |
| ... | |
| CPLD REGISTER BANK ADDRESS q | WHERE q IS THE "NUMBER OF CPLD REGISTER BANKS" DEFINED IN THE EEPROM HEADER |
| VALUE FOR CPLD REGISTER BANK ADDRESS q | WHERE q IS THE "NUMBER OF CPLD REGISTER BANKS" DEFINED IN THE EEPROM HEADER |
| STATE 2 | |
| ... | |
| STATE s | WHERE s IS THE "NUMBER OF VALID STATES" DEFINED IN THE EEPROM HEADER |

FIG.5

| FIELD DESCRIPTION | NOTES |
|---|---|
| DEFAULT SEQUENCE 0 | |
| DEFAULT SEQUENCE NUMBER | |
| SEQUENCE NUMBER | |
| APPLICABLE BAND | 0 = 2.4 GHz, 1 = 5 GHz |
| SPECTRUM ANALYSIS OR WIFI | 0 = WIFI, 1 = SPECTRUM ANALYSIS |
| DEFAULT SEQUENCE 1 | |
| ... | |
| DEFAULT SEQUENCE z | WHERE z IS "NUMBER OF DEFAULT SEQUENCES" DEFINED IN THE EEPROM HEADER |
| SEQUENCE 0 | |
| SEQUENCE NUMBER | |
| SEQUENCE LENGTH (NUMBER OF STATES) | THIS FIELD DETERMINES VARIABLE u USED INSIDE THIS SEQUENCE |
| APPLICABLE BAND | 0 = 2.4 GHz, 1 = 5 GHz, 2 = DUAL |
| FIRST STATE IN THE SEQUENCE | |
| SECOND STATE IN THE SEQUENCE | |
| ... | |
| SEQUENCE STATE u | WHERE u IS "SEQUENCE LENGTH (NUMBER OF STATES)" DEFINED IN THE 3rd BYTE OF THIS SEQUENCE DEFINITION |
| SEQUENCE 1 | |
| SEQUENCE 2 | |
| ... | |
| SEQUENCE t | WHERE t IS "NUMBER OF SEQUENCES" DEFINED IN THE EEPROM HEADER |

FIG.6

| FIELD DESCRIPTION | NOTES |
|---|---|
| CHANNEL RECORD 0 | |
| CHANNEL RECORD NUMBER | |
| NUMBER OF ANTENNAS IN CHANNEL RECORD | |
| TOTAL LENGTH OF CHANNEL RECORD | IN BYTES |
| ANTENNA 1 CAL DATA | |
| ANTENNA ELEMENT NUMBER | IDENTIFIER FOR ANTENNA ELEMENT (ALLOWS FOR MINIMIZING POPULATION OF DATA FOR CHANNGEL RECORDS THAT DON'T APPLY (E.G. 2.4 GHZ CHANNEL RECORD AND 5 GHZ ONLY ANTENNA) |
| 1ST RF PATH TO ANTENNA 1 | ANTENNA PATH DESIGNATION: A = 0, B = 1, C = 2, D = 3, ETC. |
| RX/TX/BIDIRECTIONAL FOR 1ST RF PATH TO ANTENNA 1 | RX = 0, TX = 1, BIDIRECTIONAL = 2 |
| MAGNITUDE FROM 1ST RF PATH TO ANTENNA 1 | 2 BYTE LOSS/GAIN MEASUREMENT FOR ANTENNA 1 (RF PATH 1) IN HUNDRETHS OF DB (--> FOR MAGNITUDE VALUE SIGN, SEE NOTE 1) |
| PHASE FROM 1ST RF PATH TO ANTENNA 1 | 2 BYTE PHASE MEASUREMENT FOR ANTENNA 1 (RF PATH 1) IN HUNDREDTHS OF DEGREES (--> FOR PHASE VALUE SIGN, SEE NOTE 2) |
| ALTERNATE DIRECTION FOR 1ST RF PATH OR 2ND RF PATH TO ANTENNA 1 | ANTENNA PATH DESIGNATION: A = 0, B = 1, C = 2, D = 3, ETC. |
| RX/TX/BIDIRECTIONAL FOR ALTERNATE DIRECTION OF 1ST RF PATH OR 2ND RF PATH TO ANTENNA 1 | RX = 0, TX = 1, BIDIRECTIONAL = 2 |
| MAGNITUDE FROM ALTERNATE DIRECTION OF 1ST RF PATH OR 2ND RF PATH TO ANTENNA 1 | 2 BYTE LOSS/GAIN MEASUREMENT FOR ANTENNA 1 (ALTERNATE DIRECTION FOR RF PATH 1 OR RF PATH 2) IN HUNDRETHS OF DB (--> FOR MAGNITUDE VALUE SIGN, SEE NOTE 1) |
| PHASE FROM ALTERNATE DIRECTION OF 1ST RF PATH OR 2ND RF PATH TO ANTENNA 1 | 2 BYTE PHASE MEASUREMENT FOR ANTENNA 1 (ALTERNATE DIRECTION RF PATH 1 OR RF PATH 2) IN HUNDREDTHS OF DEGREES (--> FOR PHASE VALUE SIGN, SEE NOTE 2) |
| ... | |
| XTH RF PATH TO ANTENNA 1 | WHERE X IS THE "NUMBER OF RF PATHS TO ANTENNA 1" |
| RX/TX/BIDIRECTIONAL FOR XTH RF PATH TO ANTENNA 1 | RX = 0, TX = 1, BIDIRECTIONAL = 2 |
| MAGNITUDE FROM XTH RF PATH TO ANTENNA 1 | 2 BYTE LOSS/GAIN MEASUREMENT FOR ANTENNA 1 (RF PATH X) IN HUNDRETHS OF DB, WHERE X IS THE "NUMBER OF RF PATHS TO ANTENNA 1" (--> FOR MAGNITUDE VALUE SIGN, SEE NOTE 1) |
| PHASE FROM XTH RF PATH TO ANTENNA 1 | 2 BYTE PHASE MEASUREMENT FOR ANTENNA 1 (RF PATH X) IN HUNDREDTHS OF DEGREES, WHERE X IS THE "NUMBER OF RF PATHS TO ANTENNA 1" (--> FOR PHASE VALUE SIGN, SEE NOTE 2) |
| ANTENNA 2 CAL DATA | |
| ... | |

FIG. 7

DYNAMIC INFORMATION STORAGE TO ENABLE ANGLE-OF-ARRIVAL SMART ANTENNAS

CROSS REFERENCE TO RELATED APPLICATION

This application is a continuation of U.S. application Ser. No. 15/220,711, filed Jul. 27, 2016, the entirety of which is incorporated herein by reference.

TECHNICAL FIELD

The present disclosure relates to smart antenna devices and their use in wireless communication applications.

BACKGROUND

Angle-of-arrival (AoA) location involves precise knowledge of antenna states of antennas in an antenna array for receiving wireless signals, sequences of antennas states, locations and calibration data. This is especially true in the case of switched antenna arrays.

Many switched array antennas may be available for use with access point devices, and the advantage for plug-and-play interoperability with access points is desirable. Each antenna array may be different. Furthermore, future antenna arrays may be increasingly flexible and complicated in terms of possible antenna states, making the permutations of antenna states and calibration data quite extensive.

BRIEF DESCRIPTION OF THE DRAWINGS

FIG. 3 illustrates an example of data stored in a header of a memory device of the smart antenna array, according to an example embodiment.

FIG. 4 illustrates an example of data stored in the memory device for each antenna element of the smart antenna array, according to an example embodiment.

FIG. 5 illustrates an example of data stored in the memory device to define each antenna state, according to an example embodiment.

FIG. 6 illustrates an example of data stored in the memory device to define antenna sequences, according to an example embodiment.

FIG. 7 illustrates an example of data stored in the memory device for calibration data for each antenna element, according to an example embodiment.

DESCRIPTION OF EXAMPLE EMBODIMENTS

Overview

In one embodiment, an apparatus is provided comprising an antenna array, a block of switches, a programmable logic device and a memory device. The antenna array comprises a plurality of antenna elements. The block of switches is configured to selectively connect respective ones of a subset of the plurality of antenna elements to corresponding ones of a plurality of transceivers in a host device. The programmable logic device is configured to communicate with the host device and to control the block of switches. The memory device is coupled to the programmable logic device, and is configured to store information allowing the host device to determine how to control connectivity of individual antenna elements to respective ones of the plurality of transceivers of the host device as part of transmit and/or receive operations of the host device.

Example Embodiments

Figure 1:
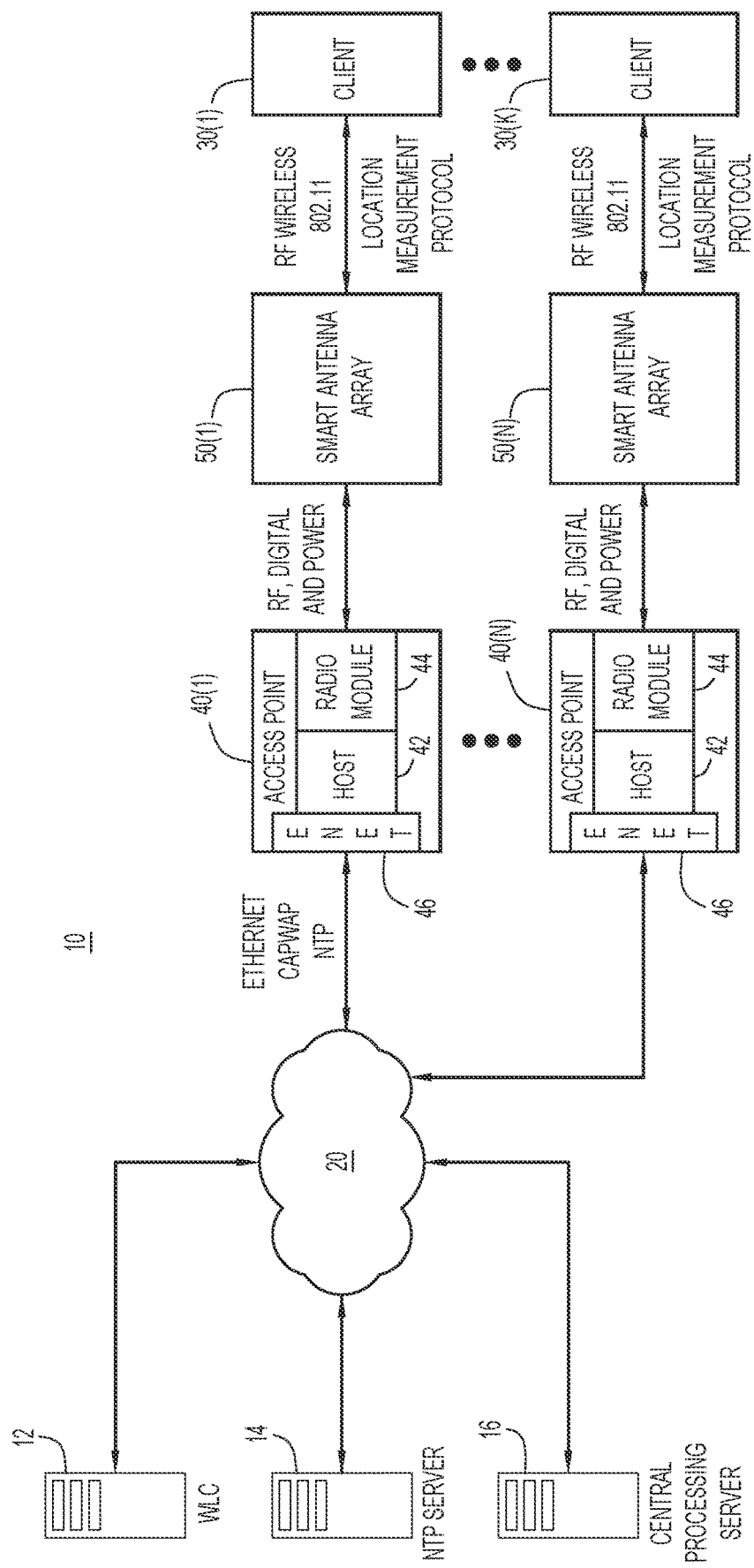
FIG. 1 is a block diagram of a location system in which a smart antenna array is used, according to an example embodiment.

Referring first to FIG. 1, a block diagram is shown of a system 10 that is useful for determining the location of a wireless device. The system 10 is described in connection with a wireless local area network (WLAN), but this is only by way of example only, and is applicable to other wireless communication environments and technologies. The system 10 includes a WLAN controller (WLC) 12, a network time protocol (NTP) server 14, and a central processing server 16 each connected to a network 20, e.g., the Internet (one or more wired or wireless local or wide area networks). In the environment where one or more wireless devices 30(1)-30(K), e.g., a WLAN client, whose location is to be determined, there are deployed a plurality of access points 40(1)-40(N) having connected thereto a smart antenna module or package 50(1)-50(N).

Each access point (AP) 40(1)-40(2) includes a host section 42 and a radio module section 44, as well as an Ethernet network interface card (ENET) 46 that enables wired network communication over network 20. The radio module section 44 interfaces directly with a smart antenna array module as shown in FIG. 1. The smart antenna array modules 50(1)-50(N) include an array of antennas, such as up to 32 antennas, for example, as described below in connection with FIG. 2. The smart antenna array modules 50(1)-50(N) detect signals transmitted by a client device and provide the detected signals to the radio module 44 of the AP to which the smart antenna module is connected. The AP may be referred to herein as a host device or host wireless device.

The WLC 12 configures and controls the APs 40(1)-40(N). The NTP server 14 serves as a timing reference with respect to the APs 40(1)-40(N) for purposes of synchronizing measurements of signals received by the smart antenna array modules 50(1)-50(N) from a client device, particularly during a location measurement procedure. To communicate with the WLC 12, NTP server 14 and central processing server 16, the APs 40(1)-40(N) may support communications over various protocols, including Ethernet, Control and Provisioning of Wireless Access Points (CAPWAP) and NTP.

Figure 2:
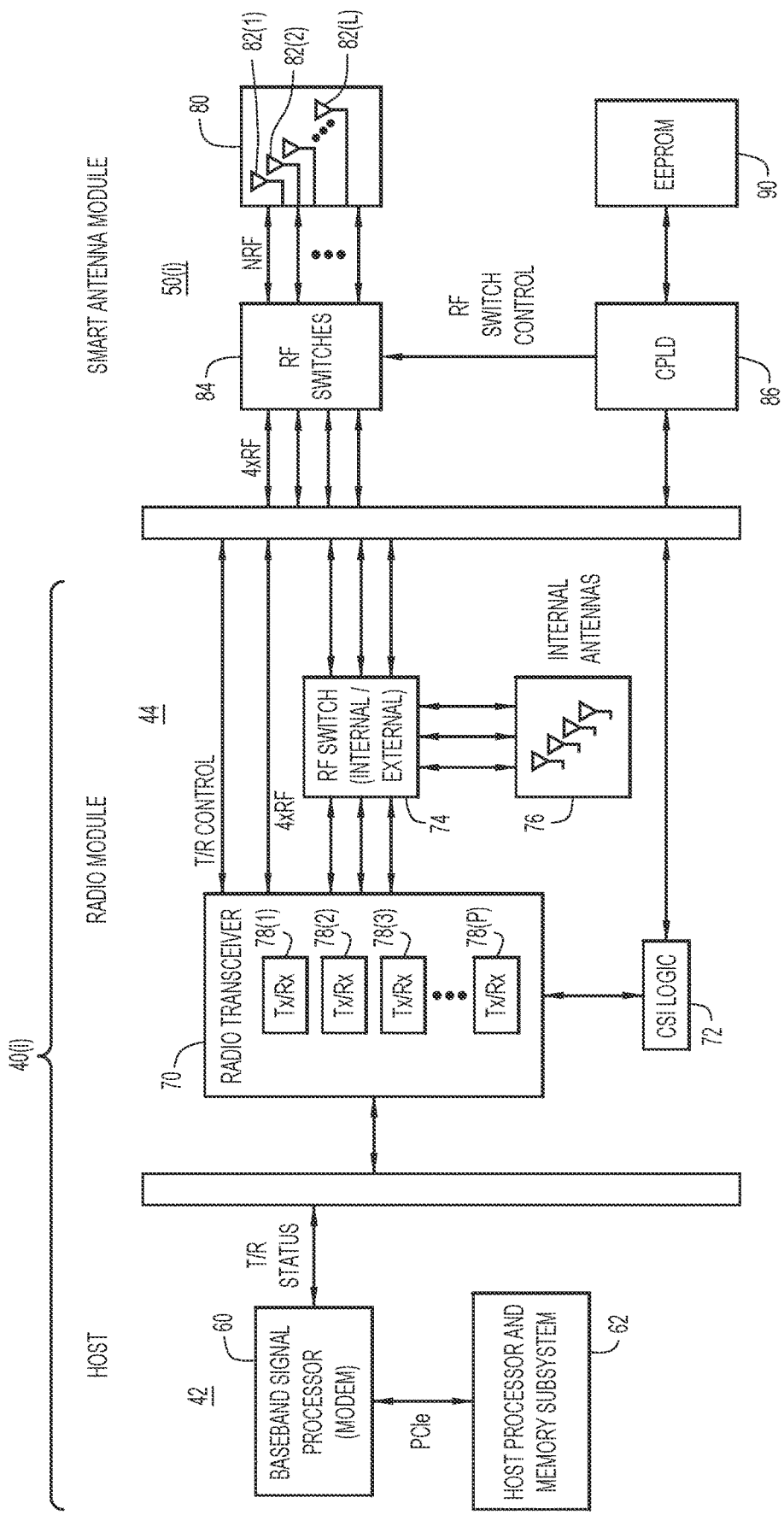
FIG. 2 is a more detailed block diagram of a wireless device to which a smart antenna array is connected for use in the system of FIG. 1, according to an example embodiment.

Reference is now made to FIG. 2. FIG. 2 shows the components of an AP 40(i) and an associated smart antenna module 50(i). The host section 42 includes a baseband signal processor (e.g., modem) 60 and a host processor and memory subsystem 62. The radio module section 44 includes a radio transceiver 70, channel state information (CSI) logic 72, an RF switch 74 and internal antennas 76. In the example shown in FIG. 2, the radio transceiver 70 includes a plurality, e.g., four, transceivers (Tx/Rx) 78(1)-78(P), where P=4. Each transceiver 78(1)-78(P) can generate an analog receive signal and convert it to a digital signal (by an analog-to-digital converter, not shown) for supply to the baseband signal processor 60 and/or host processor and memory subsystem 62. The RF switch 74 connects the radio transceiver 70 to either the internal antennas 76 or to the antennas of the smart antenna module 50(*i*). The radio transceiver 70 may be implemented in an integrated circuit (IC) and may include control functionality integrated therewith. The CSI logic 72 computes channel state information based on signals received by the plurality of transceivers 78(1)-78(P) using antenna calibration information stored by the smart antenna module 50(*i*) as described below.

The smart antenna module 50(*i*) includes an antenna array 80 that comprises a plurality of antenna elements 82(1)-82(L), an RF switches block 84, a complex programmable logic device (CPLD) 86 and a memory 90, e.g., an Electrically Erasable Programmable Read-Only Memory (EEPROM). The EEPROM 90 stores data that characterizes the antenna array 80 and is used for additional purposes as described herein.

The purpose of the smart antenna module 50(*i*) is to expand the number of P transceiver paths (defined by the P plurality of transceivers 78(1)-78(P)) available in the radio module 44 up to the L plurality of antenna elements 82(1)-82(L) in the antenna array 80 through RF switches block 84 so that multiple overlapping subsets of antennas may be connected to the radio module 44 over time. At any moment in time, a subset (up to P (e.g., P=4)) of the antenna elements 82(1)-82(L) may be connected to the radio module 44.

It is desirable to be able to support various antenna array packages that "plug" in to radio module 44 of an AP 40(*i*) and be able to use the various antenna array packages to support location procedures. Information stored in EEPROM 90 of the smart antenna array module 50(*i*) is loaded into firmware of the AP 40(*i*), and in particular to the CSI logic 72 and radio transceiver 70. Presented herein are techniques to store the information in the EEPROM 90 that is useful in AoA location and precise location techniques.

The subset of antenna elements of the antenna array 80 that are connected to the radio module 44 at any moment in time is defined by the antenna state that is configured via the radio transceiver 70 through a digital interface between the radio module 44 and the smart antenna array module 50(*i*), and in particular between the radio transceiver 70 and CSI logic 72, and CPLD 86. The antenna state is mapped to the required RF switch control signals by the smart antenna array module 50(*i*). The antenna state control signal mapping is specific to each smart antenna design.

For example, two antenna configurations that may be supported by the AP 40(*i*) are a 32-element circular array and a 16-element planar array. Each array has its technical advantages. A circular array may be designed to mount overhead of a coverage area, such as an AP mounted over a set of cubicles with location accuracy optimized in a cone below the AP. A planar array may be designed to mount in a wide-open space (e.g. mall atrium or open manufacturing floor) on the deployment perimeter.

As explained above, during a given location measurement procedure, antennas of the antenna array (which outnumber the number of transceivers in the radio module) need to be connected to the transceivers in the radio module. The path in the radio module to which a given antenna of the smart antenna array is connected is referred to as an "antenna state". The EEPROM 90 stores information that indicates which antennas map to which paths of the transceiver 70 in the radio module for any given antenna state, definition of sequences made up of multiple antenna states, and control bytes that change for different states. A sequence is the cycling through over time between different antenna states. This and other information is pulled from the EEPROM 90 when the smart antenna module 50(*i*) is plugged into the AP 40(*i*). The smart antenna module 50(*i*) uses the information stored in the EEPROM 90 to inform the AP 40(*i*) and other entities upstream from the AP, such as the WLC 12 and central processing server 16 (shown in FIG. 1) how the smart antenna module 50(*i*) is configured and controlled as well as any particular calibration data (determined at factory time). This enables precise control (by the AP 40(*i*) and any of these upstream entities) of receive signal capture on specific antennas during a location measurement procedure.

Examples of antenna states are (where there are four radio paths in the radio module, radioPath_A, radioPath_B, radioPath_C, and radioPath_D):

State 0:
  antenna 1→radioPath_A,
  antenna 2→radioPath_B,
  antenna 3→radioPath_C,
  antenna 4→radioPath_D,
State 1:
  antenna 1→radioPath_A,
  antenna 5→radioPath_B,
  antenna 6→radioPath_C,
  antenna 7→radioPath_D, A sequence is the cycling through, over time, of different antenna states. An example is:
  sequence0={state0, state1, state2, ... , stateN}

There are several motivations for using the EEPROM 90 in a plug-and-play AoA location system, such as depicted in FIG. 1. The EEPROM 90 may have a flexible and general EERPOM structure format that accommodates any antenna type. The EEPROM 90 may store one or more of the following data:

1. Specific switched antenna state sequences, and when the smart antenna module 50(*i*) is connected to the radio module 44, this information is pushed to the firmware of the radio module.

2. Different sequences for different frequency bands and radio operation (2.4 GHz versus 5 GHz, Wi-Fi® capture versus Bluetooth® Low Energy BLE, receive versus transmit).

3. Definitions of antenna states that is pushed to radio module firmware.

4. Antenna-specific CPLD control bytes and register addresses for the radio module firmware to control antenna state switching.

5. Calibration data of antenna states that is pushed to the radio module firmware. The calibration for an antenna state may be the group delay or phase introduced due to a particular RF path from an antenna to transceiver in the radio module. The EEPROM 90 may store antenna-specific offsets to be applied to AoA data vectors.

6. Antenna beam patterns that may be pushed to the central processing server.

If information is not stored in EEPROM 90, it may be retrieved from a central or cloud-based database based on product identifier (PID). The radio module may modify the specific antenna state scanning based on antenna capability. The WLC 12 or central processing server 16 may download additional information (from the cloud) based on PID to further utilize the antennas. The EEPROM 90 may be used for controller antenna PID and capability discovery. The central processing server may initiate system calibrations upon discovery (e.g. auto-align antennas), update scanning/grouping, etc.

A summary of information stored in the EEPROM 90 is explained below in Table 1.

TABLE 1

Smart Antenna Identification Data

| | |
|---|---|
| numberAntenna | Total number of antennas in the array. |
| antennaStateMap | Table that maps the antennaState to set of active antenna elements and RF port. |
| antennaElementLocation | Table that maps each antennaElement to a relative location (x, y, z) in the array, relative to array center. |
| antennaElementOrientation | Unit normal vector of each element (used with element pattern information). |
| antennaCalibration | Table of relative loss and phase for each antennaState. |
| antennaPattern | 'out-of-band' lookup table with pattern data (magnitude, phase) vs. azimuth and elevation angle for an isolated antenna element in the array. |
| antennaElementId | Unique part number for the antenna element matched with pattern information. |
| arrayOrientationMarker | Relative location (x, y, z) of the visible orientation marker on the array assembly, relative to array center. |
| antennaId | Unique part # or identifier for the antenna model. |

Reference is now made to FIGS. 3-7 for a further description of an example data structure format for the EEPROM 90. FIG. 3 illustrates an example of header information of the EEPROM. The header information may include information concerning antenna serial number, antenna array capability, antenna PID, number of antenna in array, calibration data version, EEPROM format version, number of RF paths, number of CPLD register banks, number of valid antenna states, number of sequences, and other information as indicated in FIG. 3, and referred to above as well as explained in the notes field of FIG. 3.

FIG. 4 illustrates an example of how antenna element information is stored in the EEPROM. For each antenna element, a plurality of information is stored, including an antenna element identifier, frequency (use for one or multiple frequency bands), number of RF paths that can be used for the antenna, location information, etc.

FIG. 5 illustrates an example of how antenna states may be defined in the EEPROM. For each state, there is defined, a state identifier, number of antenna in state, number of CPLD register banks, for each RF (transceiver path of host device), an RF path identifier and antenna assignment are stored. In addition, CPLD register band address values are stored (associated with the number of applicable CPLD register banks) so defined.

FIG. 6 shows an example of how antenna sequences may defined in the EEPROM. A set of default sequences may be stored in the EEPROM. The default sequences are used by default. There may be 1 default sequence per operation modes (e.g., 1 default sequence for Wi-Fi 5 GHz, 1 default sequence for Wi-Fi 2 GHz, 1 default sequence for spectrum management in the 2 GHz frequency band, and 1 default sequence for spectrum management in the 5 GHz frequency band). Other sequences can be included in the EEPROM and the firmware of the host device could choose to use them instead in one or more of those operation modes. Unless the firmware explicitly selects to use a non-default sequence, the default ones may be chosen.

Non-default sequence 0 through sequence t may be defined, where t is the number of sequences defined in the header (FIG. 3). For each sequence, the following information may be stored: a sequence number, sequence length, applicable frequency band, first antenna state in the sequence, second antenna state in the sequence, etc.

FIG. 7 illustrates an example of calibration data is stored in the EEPROM. As explained above, the calibration data for an antenna state may be the group delay or phase introduced due to a particular RF path from an antenna to transceiver in the radio module. For simplicity, FIG. 7 shows the various components of the calibration data for one antenna. Similar data may be provided for each of the other antenna elements in the antenna array.

Figure 8:
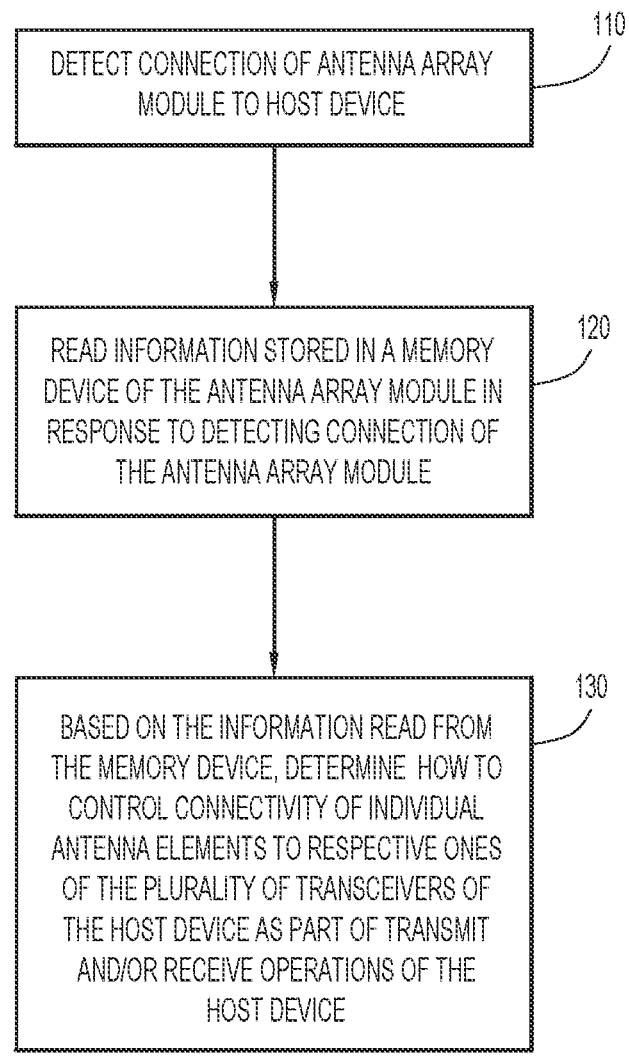
FIG. 8 is a flowchart depicting operations performed by a host wireless device that reads content of the memory device of the smart antenna array, according to an example embodiment.

Reference is now made to FIG. 8. FIG. 8 illustrates a flow chart of a method 100 performed when a host wireless device, e.g., an AP 40($i$), is connected to an antenna array module 50($i$), having the configurations described above in connection with FIGS. 1 and 2. At 110, connection of antenna array module to the host device is detected by the host device, e.g., by the radio module section 44 of the host device (and in particular the CSI logic 72). At 120, the host device reads information stored in a memory device (e.g., EEPROM 90) of the antenna array module in response to detecting connection of the antenna array module. At 130, based on the information read from the memory device, the host device determines how to control connectivity of individual antenna elements to respective ones of the plurality of transceivers of the host device as part of transmit and/or receive operations of the host device.

As explained above, the information stored in the memory device includes antenna state information that indicates, for a given period of time, the subset of antenna elements of the antenna array connected to corresponding ones of the plurality of transceivers of the host device, and sequence information that specifies one or more sequences, each sequence comprising a plurality of antenna states to be cycled through over time. Commands to control a block of switches in the antenna array module are generated based on the sequence information and antenna state information. Furthermore, the information stored in the memory device further includes programmable logic device control bytes and register addresses for the host device to control antenna state switching using the block of switches during a sequence. The commands are generated based further on the programmable logic device control bytes and register addresses. Further still, the information stored in the memory device further includes calibration data in terms of group delay or phase introduced due to a particular path from an antenna element of the antenna array to a transceiver in the host device. In the host device, measurements made on a given transceiver are adjusted based on the calibration data prior to forwarding the measurements to another device (e.g., the central processing server 16 shown in FIG. 1) for further processing.

Again, by storing information pertinent to the smart antenna module in a memory of the smart antenna module, firmware in the host device can easily and immediately detect the smart antenna module and begin using its functionality. Once host device detects presence of a smart antenna module due to its connection, firmware on the host device (such as the AP) is able to look in a specific location of the EEPROM of the smart antenna module for antenna identification information. If one of a number of identification codes is detected, the firmware can determine that the smart antenna module has information pertinent to system operation on its memory device and the firmware can start accessing specific locations within the memory device of the smart antenna module to extract this information.

Since most smart antenna modules cannot use all antenna elements of the antenna array at once, information needs to be passed to the rest of the system to indicate which antenna elements should be used together (referred to herein as antenna states), and sequences in which the antenna states should be cycled for particular applications such as location detection. To reduce the size and amount of change to firmware in other network devices, even information on how to set the antenna array into a given state is stored in the antenna memory device. One example of this is a series of CPLD commands to be issued to set antenna switches to the appropriate switch state for routing given RF paths to particular antennas to set the desired antenna state.

Since there are numerous configurations for an antenna array, allocating storage space for every possible combination becomes prohibitive. Therefore, the EEPROM of the smart antenna module additionally stores information based on antenna array parameters and only populates values for valid antenna/frequency/path possibilities given the states defined within the memory. This flexible storage of calibration information allows the upstream firmware (in the AP or other connected network device) to pull in information from numerous antenna configurations and manipulate it to immediately use the antenna array. This saves nonvolatile memory space on the antenna array as well as saves volatile memory space on the network devices that use the information from the antenna array.

The information stored in EEPROM of the smart antenna module, once extrapolated by the firmware, is passed along to devices further back in the network (for example, the AP, WLC 12, central processing server 16, shown in FIG. 1, etc.) and used for data processing of information passed through the antenna array. Information applicable to an individual antenna element (such as calibration information) is used by firmware in network devices "close" to the antenna array. Information applicable to every antenna of a particular product identifier (e.g. antenna element orientation) is pushed further into the network and stored per product identifier. The central processing server 16, for example, can use antenna element orientation or position information to apply received signal phase information to assist in locating client devices. The AP may apply antenna calibration information to each measurement before passing along measurement information to the next network device, e.g., WLC 12 or central processing server 16.

In summary, techniques are presented herein for flexible storage of information in a memory device of an antenna array including detailed information about the array operation that allows firmware on network devices to quickly compute how to operate the antenna array without bloating or requiring changes to the network device code for every different array variant. The advantage of storing antenna array operation information in memory space on an antenna array is that it minimizes the changes needed to the code of all other network devices that process information received or transmitted through that antenna array. Pushing information relevant to every antenna further into the network infrastructure allows for numerous antenna array configurations without adding changes to software/firmware in the network devices. Storage of information in this way minimizes memory space both on the antenna and in the network devices that use the information.

In one form, an apparatus is provided comprising: an antenna array comprising a plurality of antenna elements; a block of switches configured to selectively connect respective ones of a subset of the plurality of antenna elements to corresponding ones of a plurality of transceivers in a host device; a programmable logic device configured to communicate with the host device and to control the block of switches; and a memory device coupled to the programmable logic device, wherein the memory device is config- ured to store information allowing the host device to determine how to control connectivity of individual antenna elements to respective ones of the plurality of transceivers of the host device as part of transmit and/or receive operations of the host device.

In another form, a method is provided comprising: detecting connection of an antenna array module to a host device; reading information stored in a memory device of the antenna array module in response to detecting connection of the antenna array module to the host device; and based on the information read from the memory device, determining how to control connectivity of individual antenna elements to respective ones of the plurality of transceivers of the host device as part of transmit and/or receive operations of the host device.

In still another form, a system is provided comprising: a host wireless device comprising a plurality of transceivers; and an antenna array module that removeably connects to the host wireless device, the antenna array module comprising: an antenna array comprising a plurality of antenna elements; a block of switches configured to selectively connect respective ones of a subset of the plurality of antenna elements to corresponding ones of the plurality of transceivers of the host wireless device; a programmable logic device configured to communicate with the host wireless device and to control the block of switches; and a memory device coupled to the programmable logic device, wherein the memory device is configured to store information allowing the host wireless device to determine how to control connectivity of individual antenna elements to respective ones of the plurality of transceivers of the host wireless device as part of transmit and/or receive operations of the host wireless device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   an antenna array comprising a plurality of antenna elements;
   a block of switches configured to selectively connect respective ones of a subset of the plurality of antenna elements to corresponding ones of a plurality of transceivers in a host device;
   a programmable logic device configured to communicate with the host device and to control the block of switches; and
   a memory device coupled to the programmable logic device, wherein the memory device is configured to store information including calibration data in terms of group delay or phase introduced due to a particular path from an antenna element of the antenna array to a transceiver in the host device so as to allow measurements made by the host device on a given transceiver to be adjusted based on the calibration data.

2. The apparatus of claim 1, wherein the information stored in the memory device further includes antenna state information that indicates, for a given period of time, the subset of the plurality of antenna elements of the antenna array connected to corresponding ones of the plurality of transceivers of the host device.

3. The apparatus of claim 2, wherein the information stored in the memory device further includes sequence information that specifies one or more sequences, each sequence comprising a plurality of antenna states to be cycled through over time.

4. The apparatus of claim 3, wherein the information stored in the memory device further includes programmable logic device control bytes and register addresses for the host device to control antenna state switching using the block of switches during a sequence.

5. The apparatus of claim 1, wherein the memory device is an Electrically Erasable Programmable Read-Only Memory (EEPROM) device.

6. The apparatus of claim 1, wherein the programmable logic device is responsive to commands from the host device to generate controls for the block of switches to control connectivity of individual antenna elements of the plurality of antenna elements to respective ones of the plurality of transceivers.

7. The apparatus of claim 1, wherein the information stored in the memory device further includes antenna beam pattern data that is pushed to a server in a network to which the host device communicates.

8. A method comprising:
  detecting connection of an antenna array module to a host device, the antenna array module including a plurality of antenna elements;
  in response to detecting the connection of the antenna array module to the host device, reading information stored in a memory device of the antenna array module, wherein the information includes calibration data in terms of group delay or phase introduced due to a particular path from an antenna element of the antenna array module to a transceiver in the host device; and
  in the host device, adjusting measurements made on a given transceiver based on the calibration data prior to forwarding the measurements to another device for further processing.

9. The method of claim 8, wherein the information stored in the memory device further includes antenna state information that indicates, for a given period of time, a subset of antenna elements of the antenna array module connected to corresponding ones of a plurality of transceivers of the host device.

10. The method of claim 9, wherein the information stored in the memory device further includes sequence information that specifies one or more sequences, each sequence comprising a plurality of antenna states to be cycled through over time, and further comprising:
  generating commands to control a block of switches in the antenna array module based on the sequence information and the antenna state information.

11. The method of claim 10, wherein the information stored in the memory device further includes programmable logic device control bytes and register addresses for the host device to control antenna state switching using the block of switches during a sequence, wherein generating commands is based further on the programmable logic device control bytes and the register addresses.

12. The method of claim 8, wherein the information stored in the memory device further includes antenna beam pattern data that is pushed to a server in a network to which the host device communicates.

13. A system comprising:
  a host wireless device comprising a plurality of transceivers; and
  an antenna array module that is configured to removeably connect to the host wireless device, the antenna array module comprising:
    an antenna array comprising a plurality of antenna elements;
    a block of switches configured to selectively connect respective ones of a subset of the plurality of antenna elements to corresponding ones of the plurality of transceivers of the host wireless device;
    a programmable logic device configured to communicate with the host wireless device and to control the block of switches; and
    a memory device coupled to the programmable logic device, wherein the memory device is configured to store information including calibration data in terms of group delay or phase introduced due to a particular path from an antenna element of the antenna array to a transceiver in the host wireless device, and the host wireless device is configured to adjust measurements made on a given transceiver based on the calibration data prior to forwarding the measurements to another device for further processing.

14. The system of claim 13, wherein the information stored in the memory device further includes antenna state information that indicates, for a given period of time, the subset of the plurality of antenna elements of the antenna array connected to corresponding ones of the plurality of transceivers of the host wireless device.

15. The system of claim 14, wherein the information stored in the memory device further includes sequence information that specifies one or more sequences, each sequence comprising a plurality of antenna states to be cycled through over time.

16. The system of claim 15, wherein the host wireless device is configured to generate commands to control the block of switches in the antenna array module based on the sequence information and the antenna state information.

17. The system of claim 16, wherein the information stored in the memory device further includes programmable logic device control bytes and register addresses for the host wireless device to use to control antenna state switching using the block of switches during a sequence, wherein the host wireless device generates the commands based on the programmable logic device control bytes and the register addresses.

18. The system of claim 16, wherein the programmable logic device is responsive to the commands from the host wireless device to generate controls for the block of switches to control connectivity of individual antenna elements of the plurality of antenna elements to respective ones of the plurality of transceivers.

19. The system of claim 13, wherein the memory device is an Electrically Erasable Programmable Read-Only Memory (EEPROM) device.

20. The system of claim 13, wherein the information stored in the memory device further includes antenna beam pattern data that is pushed to a server in a network to which the host wireless device communicates.

* * * * *